A. J. WALTER.
STERILIZER.
APPLICATION FILED SEPT. 15, 1920.
1,430,421.
Patented Sept. 26, 1922.
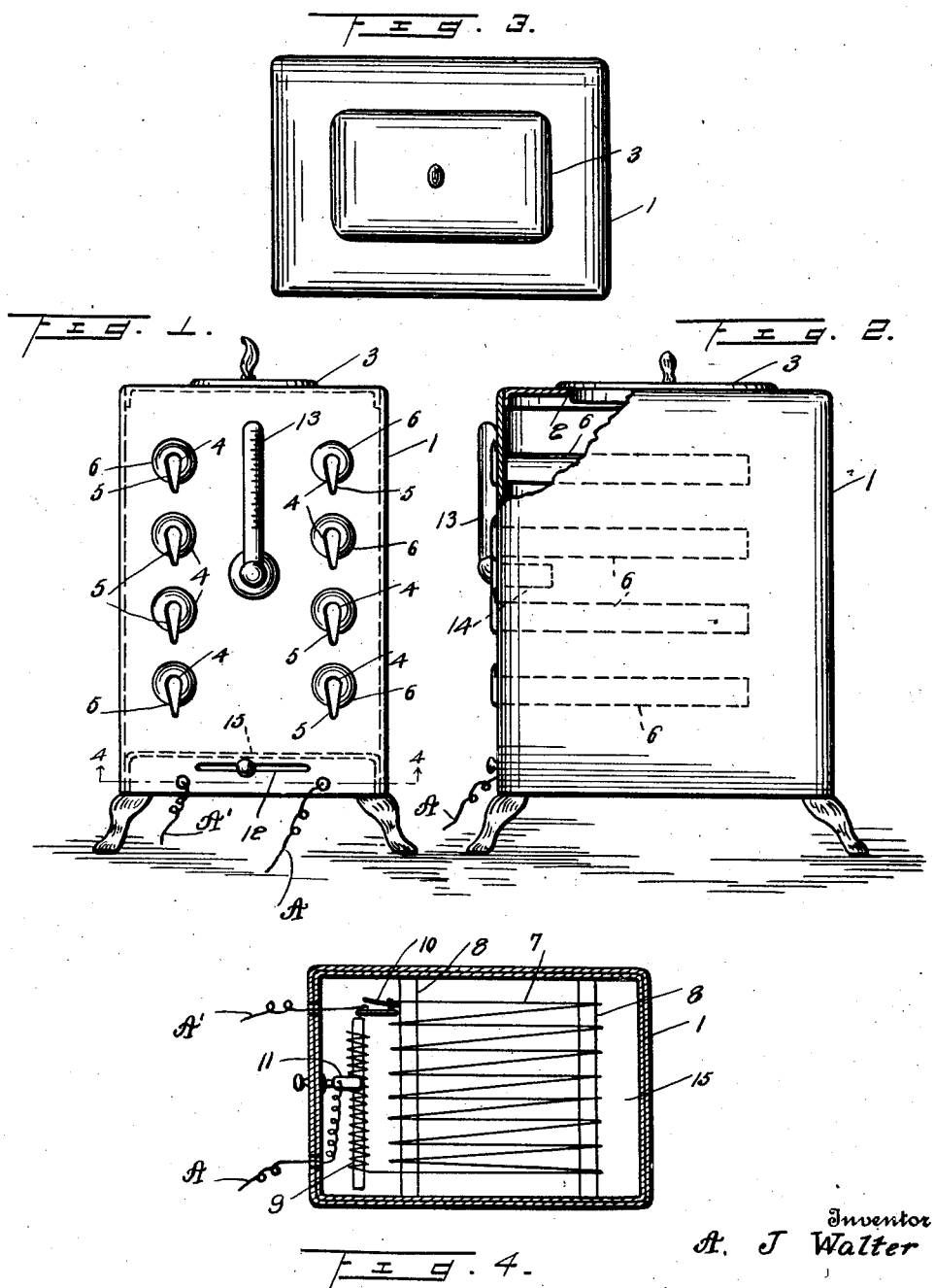
Inventor
A. J Walter Patented Sept. 26, 1922.

1,430,421

UNITED STATES PATENT OFFICE.

ALLEN J. WALTER, OF MANSFIELD, OHIO.

STERILIZER.

Application filed September 15, 1920. Serial No. 410,450.

*To all whom it may concern:*

Be it known that I, ALLEN J. WALTER, a citizen of the United States, residing at Mansfield, in the county of Richland and State of Ohio, have invented certain new and useful Improvements in Sterilizers; and I do hereby declare the following to be a full, clear, and exact description of the invention, such as will enable others skilled in the art to which it appertains to make and use the same.

The invention relates to devices for sterilizing barbers' tools, surgical instruments and the like and has for its object the provision of a hollow container having a plurality of tubular receptacles secured to one or more walls thereof and opening outwardly, the receptacles extending inwardly of the container.

The receptacles are designed to receive and hold barbers' razors, and other edge tools.

Another object of the invention is the provision of means for heating the interior of the container by an electric heater, an adjustable resistance being provided to control the temperature as indicated by a thermometer on the front of the container. A thermal cut-out is also provided to prevent an excessive rise in temperature.

My invention will be described in detail hereinafter and illustrated in the accompanying drawings in which;

Fig. 1 is a front view in elevation of my improved sterilizer,

Fig. 2, a side view partly broken away,

Fig. 3, a top plan view, and

Fig. 4, a horizontal sectional view on the plane indicated by line 4—4 of Fig. 1.

In the drawings similar reference characters will be used to designate corresponding parts in the several views.

The sterilizer comprises a container 1 that is shown to be of substantially rectangular construction in the drawings but may obviously be of any shape and dimensions desired. The top of the container is provided with an opening 2 admitting into its interior that is closed by a removable flanged cover 3.

The front wall of container 1 is provided with a plurality of slotted openings 4, the upper portion of each opening being wider than the lower portion and the side walls 5 inclined toward one another. Secured to the inner side of the front wall of the container, and opposite each slot 4, is a tubular receptacle 6 of substantially the same shape as the slot. The purpose of slots 4 and receptables 6 is to receive the blades of razors and other edge tools for sterilization, this structure admitting of subjecting the blades alone to a sterilizing temperature as the handles of the tools will remain outside of the receptacle.

It will be understood that other tools and implements such as hair clippers, combs, brushes, etc., may be sterilized by placing them inside the container through opening 2.

The heating of the interior of container 1 and receptacles 6, therein, is accomplished by an electric heater comprising a heater coil 7 supported on suitable rods 8, one terminal of the coil 7 being connected to a rheostat 9 while the other terminal of the heater coil 7 is connected to a thermal cut-out 10. 11 indicates a sliding contact movably mounted in horizontal slot 12 on the front wall of container 1. The power wires A and A' are connected to said sliding contact 11 and to the thermal cut-out 10 respectively. The purpose of sliding contact 11 is to regulate the temperature of the interior of container 1 as desired, the temperature being indicated on thermometer 13 mounted on the front wall and communicating with the interior of container 1 by means of tube 14. 15 indicates a horizontal partition, preferably of sheet metal over the heater coil 7 to evenly distribute the heat in the container.

It will be understood that in use the operator adjusts the sliding contact 11 to secure the degree of temperature in the container 1 desired, said temperature being indicated on thermometer 13. The articles to be sterilized are placed inside the container through opening 2 while razors and other edge tools are placed in receptacles 6 through slots 4, the handles of the razors and other edge tools remaining outside the receptacles.

Should the temperature within the container 1 rise above a predetermined degree the thermal cut-out 10 will automatically operate to prevent a further rise in temperature.

I claim:—

1. In a sterilizer a container, means to heat the interior of the container, and tubular receptacles communicating with openings in a wall of the container.

2. In a sterilizer a container, means to heat the interior of the container, and tubular receptacles elongated in cross section and communicating with slots in a wall of the container.

3. In a sterilizer a container divided into two compartments by a partition, one of said compartments adapted to receive articles to be sterilized, the other compartment containing an electric heater comprising a heating coil, a resistance coil connected with one terminal of the heating coil, an adjustable contact engaging said resistance coil, one terminal of a power circuit communicating with the free terminal of the heating coil, and the other terminal of the power circuit connected to the adjustable contact.

4. In a sterilizer a container, a partition in said container dividing it into two compartments, an electric heater contained in one compartment and comprising a heating coil, a resistance coil connected with one terminal of the heating coil, a thermal cut-out connected with the other terminal of the heating coil, an adjustable contact engaging said resistance coil, and a power circuit having one of its terminals connected with said thermal cut-out and the other terminal with the adjustable contact.

In testimony whereof I affix my signature in presence of two witnesses.

ALLEN J. WALTER.

Witnesses:
L. Z. PARSONS,
LUCILLE CROUSE,